Dec. 15, 1936. W. G. KIRCHHOFF 2,064,758
DOUGH MIXER
Filed May 6, 1935

Inventor
William G. Kirchhoff

By Murray & Zugelter
Attorneys.

Patented Dec. 15, 1936

2,064,758

UNITED STATES PATENT OFFICE 2,064,758

DOUGH MIXER

William G. Kirchhoff, Cincinnati, Ohio, assignor to The J. H. Day Company, Cincinnati, Ohio, a corporation of Ohio Application May 6, 1935, Serial No. 19,916

7 Claims. (Cl. 259—109)

The present invention relates to a mixer for plastics such as dough and the like.

An object of the invention is to provide means in connection with a dough mixer whereby the dough, in the process of mixing, will be beneficially stretched and kneaded, and precluded from undue rise in temperature by reason of excessive impact and friction of the dough upon the walls of the mixing tank.

Another object of the invention is to provide a dough mixer with means which will effectually intercept a mass of dough as it is moved by the agitator within the tank, to prevent the noise incident to beating of the dough against the rear of the tank.

Another object of the invention is to provide means for the purpose stated, which is simple of construction and effective for the production of a high grade dough of uniform texture.

A further object of the invention is to provide means for the purpose stated, which will maintain the dough mass, during the mixing operation, within the sphere of movement of the agitator bars.

The foregoing and other objects are attained by the means described herein and disclosed in the accompanying drawing, in which.

Figure 1:
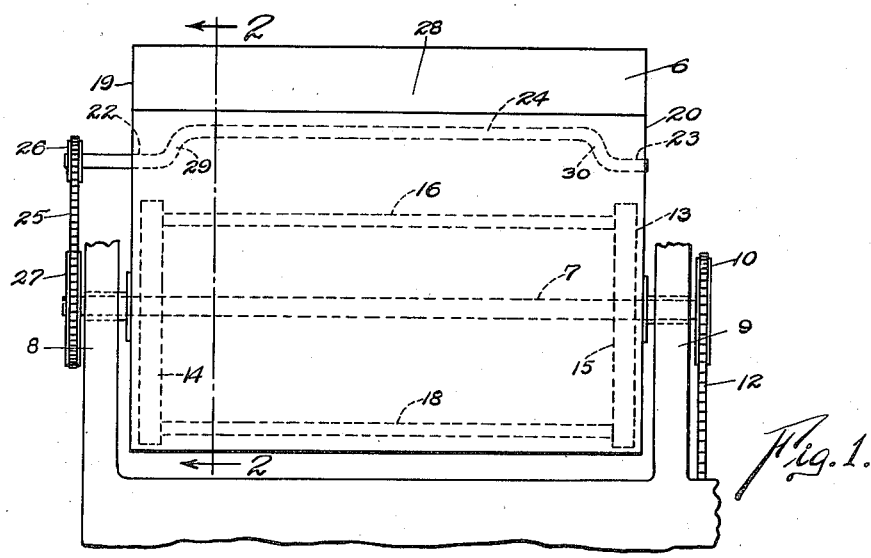
Fig. 1 is a fragmental elevational view showing a dough mixer embodying the invention.

The mixing tank or bin 6, as disclosed herein, is of a type adapted to be tilted for removing the contents thereof. The tank 6 is suitably supported upon a main shaft 7 journaled in suitable bearings upon the uprights 8 and 9 of a dough mixer frame. Any approved tilting mechanism such as a hand wheel and train of gears (not shown) may be employed for the purpose of tilting the tank. This feature is old in the art and need not be described further.

The main shaft 7 is adapted to be rotated in any suitable manner such as by means of a sprocket 10 and chain 12 driven by means of a motor or the like within or adjacent to the frame 9, and upon said shaft there is keyed or otherwise fixed an agitator, indicated generally by the character 13. The agitator may be of any approved construction, there being shown a pair of multiple armed spiders 14 and 15, the various arms 150 thereof being equipped with agitator bars 16, 17 and 18. It is to be understood that the said bars connect corresponding arms of the two spiders, and that said bars may be either fixed or rotatably supported relative to the corresponding arms of the spiders. The spiders are adapted to rotate with the main shaft 7, in close proximity with the end walls 19 and 20 of the tank.

At a location above the agitator, and preferably in the vicinity of the rear wall 21 of the tank, there is provided a dough-intercepting stretcher element having bearing ends 22 and 23 journaled for rotation relative to the end walls of the tank. That portion of the intercepting stretcher element which is intermediate the bearing ends is offset as indicated at 24, so as to be capable of swinging about the axis of rotation of said element. The swinging movement referred to results from power rotating the intercepting stretcher element as will be explained.

The intercepting stretcher element is rotated in timed relation to the rotation of the agitator, so that the offset portion 24 dips down between adjacent agitator bars, such as 17 and 16, at least once as said bars pass by the intercepting stretcher element during rotation of the agitator. For example, with the three armed agitator shown herein by way of illustration, the intercepting stretcher element may be rotated at a ratio of 3 to 1 with respect to the agitator rotation, so that the off-set portion 24 thereof dips down between the agitator bars 17 and 16 once upon each one-third rotation of the agitator. By changing the driving ratio to 6 to 1, the off-set portion 24 may be caused to dip down twice instead of once, between adjacent agitator bars. It will be understood that other ratios may be employed so long as the timing of the agitator and intercepting stretcher element movements do no conflict.

It is of course evident that the number of agitating rods carried by the agitator will determine the basic ratio of relative rotation of the agitator and the element 24. There is shown herein one of several means for power actuating the intercepting stretcher element, said means being in the form of a chain 25 which passes over sprockets 26 and 27 that are fixed to the intercepting stretcher element and the agitator shaft respectively. As the tank 6 is held stationary, the main shaft 7 is driven by means of the driving means 10—12, thereby to rotate the agitator, while at the same time the sprocket 27 functions, through the medium of chain 25 and sprocket 26 to rotate the intercepting stretcher element in pre-determined timed relation to rotation of the agitator. Although the power transmission means 25—26—27 shown in the accompanying drawing functions to rotate both the agitator and the intercepting stretcher element in a clockwise direction of rotation, the invention contemplates also the use of gearing or other transmitting means whereby those parts may be rotated, one in a counterclockwise direction and the other in clockwise direction of rotation.

Figures 2, 3:
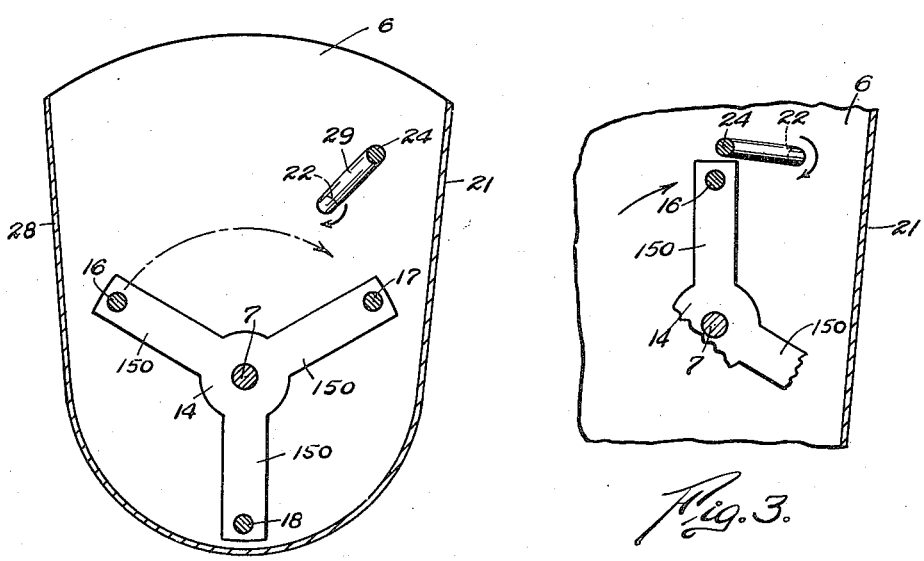
Fig. 2 is a cross sectional view taken on line 2—2 of Fig. 1, showing certain relative positions of the agitator and an intercepting stretcher element which forms part of the present invention.
Fig. 3 is a fragmental detail view showing another relationship between an agitator bar and the intercepting stretcher element.

In the operation of the device, flour and water and the various ingredients for dough are placed in the tank 6, whereupon the agitator is rotated until the ingredients form a plastic mass having great cohesive properties. Said mass assumes the nature of a large ball or lump which is carried around from the bottom of the tank, up the front wall 28 thereof, and over toward the rear wall 21. As the lump is directed toward the rear wall by an agitator bar such as 16, the dough intercepting stretcher element dips down ahead of the bar 16, thereby to intercept the mass of dough and break the impact force thereof which is directed toward the rear 21 of the tank. The rotational movement of the element 24 results in a beneficial stretching or kneading of the dough, which is followed by a tumbling thereof downwardly toward the bottom of the tank without undue friction of the dough on the rear wall 21. The Fig. 3 detail clearly illustrates how the off-set portion 24 of the intercepting stretcher element would intercept and lift a portion of the dough mass advanced by the agitator bar 16 when said bar reaches a position substantially above the main shaft 7. Referring again to Fig. 3, it will be understood that further advancement of the agitator bar 16 is followed by a clockwise rotational movement of the off-set portion 24 of the intercepting stretcher element, so that said portion will dip down behind the agitator 16 and assume a relationship, similar to that shown in Fig. 3, with respect to the next agitator bar.

The manner in which the intercepting stretcher cooperates with the agitator bars in succession, results in a gentle kneading of the dough mass without undue tearing. The resultant stretching action is properly limited, and therefore beneficial to the dough, because the intercepting stretcher is caused to work substantially within the orbit of agitator movement by reason of the "dipping" action referred to above. The ultimate result of the construction disclosed is a fine textured and uniform character of dough.

It is noteworthy that the radial portions 29 and 30 of the intercepting stretcher element, are inclined or disposed at less than a right angle to the axis of the bearings 22 and 23, this being for the purpose of urging the dough mass constantly toward the center of the off-set portion 24 of the intercepting stretcher element. This construction is effective for keeping the dough mass out of the path of movement of the spider arms, so that the drag on the agitator may not become excessive, and so that the dough mass is not unduly torn apart and mixed as individual lumps.

While the intercepting stretcher element is shown as being of substantial U shape, it is to be understood that it may be formed of V or S shape, if desired.

What is claimed is:

1. In an apparatus for mixing dough and the like, the combination of a mixing tank, a rotating agitator within the tank and movable about a horizontal axis for mixing the dough, a dough stretching and kneading element supported upon a bearing whose axis is parallel to and spaced from the agitator axis, for movement within the tank and power-actuated to approach and recede from the agitator during the mixing operation, and means for actuating said element at an angular speed of rotation at least twice that of rotation of the agitator, to apply to the dough mass a short quick directional impelling force.

2. In an apparatus for mixing dough and the like, the combination of a mixing tank including a rear wall, a rotating agitator movable about an axis within the tank and including a plurality of spaced agitating bars for mixing the dough and throwing it toward said wall of the tank, a dough intercepting and stretching element rotatably supported to move about a separate axis within the tank, above the agitator and ahead of said wall, and including an offset portion which moves about the axis of rotation of said element, said axis being located outside the orbit of the agitator path of movement and means for rotating the intercepting and stretching element in timed relation to the agitator rotation, whereby to cause an approach and recession of said offset portion relative to the agitator during the mixing operation.

3. In an apparatus for mixing dough and the like, the combination of a mixing tank including an inclined wall, a rotating agitator on a horizontal axis within the tank and including a plurality of spaced agitating bars for mixing the dough and throwing it toward said wall of the tank, a dough intercepting and stretching element, and bearing means near the wall and above the agitator for supporting said element within the tank ahead of said wall, said intercepting and stretching element including an offset portion which moves about the axis of rotation of said element, and means for rotating the intercepting and stretching element in timed relation to the agitator rotation, the axis of rotation of said element being located outside the orbit of agitator movement to cause at least one approach and recession cycle of said offset portion toward and from each of the spaces between the bars of the agitator during the mixing operation.

4. In an apparatus for mixing dough and the like, the combination of a mixing tank including an inclined wall, a rotating agitator movable about a substantially horizontal axis within the tank and including a plurality of spaced agitating bars for mixing the dough and throwing it toward said wall of the tank, a dough intercepting and stretching element, and bearing means for supporting said element above the agitator for movement within the tank ahead of said wall, and means for power-advancing the dough intercepting and stretching element successively into and from each of the spaces between successive bars of the agitator, as the agitator rotates within the tank, said means rotating both the agitator and the intercepting and stretching element in a common direction about their separate axes.

5. In an apparatus for mixing dough and the like, the combination of a mixing tank including an inclined wall, a rotating agitator movable about a substantially horizontal axis within the tank and including a plurality of spaced agitating bars for mixing the dough and throwing it toward said wall of the tank, a dough intercepting and stretching element and bearing means therefor supporting said element within the tank ahead of said wall, and including a single offset portion which moves about the axis of rotation of said element, and means for rotating the intercepting and stretching element at an angular speed not less than twice that of the agitator rotation, whereby to cause at least one complete approach and recession cycle of said offset portion relative to each space between the agitator bars during the mixing operation.

6. In an apparatus for mixing dough and the like, the combination of a mixing tank, a large rotating agitator within the tank comprising spaced arms for mixing the dough and throwing it toward a wall of the tank, and a comparatively small crooked dough intercepting and stretching element rotatably supported with its rotating axis entirely outside the limits of the agitator but disposed in the path of movement of the dough to diminish pounding thereof against the tank wall, and means driven during the agitator movement for dipping the crooked portion of the intercepting and stretching element into and then immediately out of each space between adjacent arms of the agitator during rotation thereof.

7. In an apparatus for mixing dough and the like, the combination of a tiltable mixing tank including an inclined wall and opposed end walls, a rotating agitator within the tank including a substantially horizontal rotatable drive shaft, and means supporting the tank for tilting movement about the axis of said shaft, said agitator including a plurality of spaced agitating bars for mixing the dough and throwing it toward said inclined wall of the tank, a crank shaped dough intercepting and stretching element journaled in stationary bearings on the opposed end walls of the tank and located adjacent to said inclined wall, and means driven by the agitator drive shaft for rotating the intercepting and stretching element at a speed of axial rotation not less than twice the speed of axial rotation of the agitator, whereby to cause at least one complete approach and recession cycle of the intercepting and stretching element relative to each space between the agitator bars during the mixing operation.

WILLIAM G. KIRCHHOFF.